United States Patent
Harishankar et al.

(10) Patent No.: US 12,019,673 B2
(45) Date of Patent: Jun. 25, 2024

(54) DIGITAL SEMANTIC STRUCTURE CONVERSION

(71) Applicant: INTERNATIONAL BUSINESS MACHINES CORPORATION, Armonk, NY (US)

(72) Inventors: Raman Harishankar, Blacklick, OH (US); Stan Kevin Daley, Atlanta, GA (US); Lucia Larise Stavarache, Columbus, OH (US); Chinmohan Biswas, Kolkata (IN); Charbak Chatterjee, Kolkata (IN); Sandipan Sengupta, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 17/247,556

(22) Filed: Dec. 16, 2020

(65) Prior Publication Data

US 2022/0188347 A1    Jun. 16, 2022

(51) Int. Cl.
| | | |
|---|---|---|
| *G06F 16/538* | (2019.01) | |
| *G06F 40/30* | (2020.01) | |
| *G06N 20/00* | (2019.01) | |
| *G06Q 50/00* | (2024.01) | |

(52) U.S. Cl.
CPC ............ *G06F 16/538* (2019.01); *G06F 40/30* (2020.01); *G06N 20/00* (2019.01); *G06Q 50/01* (2013.01)

(58) Field of Classification Search
CPC ........ G06F 16/50; G06F 16/53; G06F 16/538; G06F 40/30
See application file for complete search history.

(56) References Cited

U.S. PATENT DOCUMENTS

| | | |
|---|---|---|
| 5,625,754 A | 4/1997 | Jungst |
| 6,924,803 B1 | 8/2005 | Girling |
| 7,739,104 B2 | 6/2010 | Berkan |

(Continued)

FOREIGN PATENT DOCUMENTS

CA    2102944 C    3/1999

OTHER PUBLICATIONS

Anonymous; Value System Based Depression Measurement and Suicide Prevention; IP.com; IPCOM000256164D; Nov. 8, 2018; 6 pages.

(Continued)

*Primary Examiner* — Pierre M Vital
*Assistant Examiner* — Jedidiah P Ferrer
(74) *Attorney, Agent, or Firm* — Schmeiser, Olsen & Watts, LLP; Edward Wixted

(57) ABSTRACT

A method, system, and computer program product for implementing a digital conversion process is provided. The method includes receiving network data and text data associated with a text presentation being presented via a hardware device of a user. Semantic attributes of the text data are analyzed, and associated concepts and premises of the text data are determined. The network data is analyzed, and the user is associated with a plurality of users associated with the text presentation resulting in the formation of a group of users. A propensity inclination is determined for the group of users with respect to specialized digital dimension and retrieved images are associated with the text data. The retrieved images are presented to the user.

20 Claims, 10 Drawing Sheets

(56) References Cited

U.S. PATENT DOCUMENTS

| | | | |
|---|---|---|---|
| 2006/0015904 A1* | 1/2006 | Marcus | H04N 7/16 |
| | | | 348/E7.071 |
| 2006/0173872 A1* | 8/2006 | Koike | G06F 16/24578 |
| | | | 707/999.1 |
| 2007/0147654 A1 | 6/2007 | Clatworthy | |
| 2015/0371423 A1 | 12/2015 | Rubin | |
| 2016/0148159 A1 | 5/2016 | Coffing | |
| 2016/0173625 A1* | 6/2016 | Ruben | H04L 67/306 |
| | | | 709/204 |
| 2016/0225187 A1* | 8/2016 | Knipp | G06F 40/131 |
| 2017/0060609 A1* | 3/2017 | Cropper | G06F 16/285 |
| 2017/0192961 A1* | 7/2017 | Dutta | G06F 16/51 |
| 2018/0260472 A1* | 9/2018 | Kelsey | G06F 16/3329 |
| 2018/0356967 A1 | 12/2018 | Rasheed | |
| 2020/0401639 A1* | 12/2020 | Kussmaul | G06F 16/9535 |
| 2021/0042800 A1* | 2/2021 | Chandra | G06Q 30/0281 |

OTHER PUBLICATIONS

Choudhury, Ambika; Top 5 AI-Based Text-To-Video Products; https://analyticsindiamag.com/category/articles; Feb. 21, 2019; 13 pages.

IBM Cloud Docs/Personality Insights; https://cloud.ibm.com/docs/personality-insights?topic=peersonality-insights-about; updated Nov. 2, 2020; 5 pages.

Pratikakis, Ioannis et al.; Semantics Extraction from Images; Knowledge-Driven Multimedia Information Extraction and Ontology Evolution—Bridging the Semantic Gap; Jan. 2011; 40 pages.

U.S. Appl. No. 15/930,564; Intelligent Social Interaction Recognition and Conveyance using Computer Generated Prediction Modeling; filed May 13, 2020; 73 pgs.

Ye, Patrick et al.; Towards Automatic Animated Storyboarding; Proceedings of the Twenty-Third Association for the Advancement of Artificial Intelligence Conference on Artificial Intelligence; Jan. 2008; pp. 578-583.

Shutterstock Extraction Images; https://www.shutterstock.com/search/extraction; retrieved from the Internet Jan. 19, 2022; 27 pages, pp. 1-13 most relevant.

Dou, Wenwen, Xiaoyu Wang, W. Ribarsky and M. Zhou. "Event Detection in Social Media Data." (2012); 4 pages.

Fedoryszak, Mateusz et al.; Real-time Event Detection on Social Data Streams; arXiv: 1907.11229v1 [cs.SI]; Jul. 25, 2019; 9 pages.

IBM Cloud Docs/Tone Analyzer; https://cloud.ibm.com/docs/tone-analyzer?topic=tone-analyzer-about#about; Mar. 6, 2020; 3 pages.

Mell, Peter et al.; "The NIST Definition of Cloud Computing;" National Institute of Standards and Technology; Special Publication 800-145; Sep. 2011; 7 pages.

Vertakova, Yulin et al.; Clustering of Socio-Economic Space: Theoretical Approaches and Russian Experience; rocedia Economics and Finance 27 (2015); pp. 538-547.

* cited by examiner

DIGITAL SEMANTIC STRUCTURE CONVERSION

BACKGROUND

The present invention relates generally to a method for digitally converting text into associated images and in particular to a method and associated system for improving software conversion technology associated with isolating sematic attributes and concepts of text data associated with a user and associating and presenting images associated with the text data.

SUMMARY

A first aspect of the invention provides a digital conversion method comprising: receiving, by a processor of a server hardware device, text data associated with a text presentation being presented via a hardware device of a user; receiving, by the processor in response to receiving authorization from the user, network based data associated with the user; analyzing, by the processor, semantic attributes of the text data; determining, by the processor based on results of the analyzing the semantic attributes, concepts and premises of the text data; analyzing, by the processor, the network based data; associating, by the processor based on the concepts and premises of the text data and results of the analyzing the network based data, the user with a plurality of users associated with the text presentation resulting in the formation of a group of users; determining, by the processor, a propensity inclination for the group of users with respect to specialized digital dimensions; associating, by the processor based on the propensity inclination for the group of users, retrieved images with the text data, wherein the retrieved images are associated with the concepts and premises; and presenting, by the processor, the retrieved images to the user.

A second aspect of the invention provides a computer program product, comprising a computer readable hardware storage device storing a computer readable program code, the computer readable program code comprising an algorithm that when executed by a processor of a server hardware device implements a digital conversion method, the method comprising: receiving, by the processor, text data associated with a text presentation being presented via a hardware device of a user; receiving, by the processor in response to receiving authorization from the user, network based data associated with the user; analyzing, by the processor, semantic attributes of the text data; determining, by the processor based on results of the analyzing the semantic attributes, concepts and premises of the text data; analyzing, by the processor, the network based data; associating, by the processor based on the concepts and premises of the text data and results of the analyzing the network based data, the user with a plurality of users associated with the text presentation resulting in the formation of a group of users; determining, by the processor, a propensity inclination for the group of users with respect to specialized digital dimensions; associating, by the processor based on the propensity inclination for the group of users, retrieved images with the text data, wherein the retrieved images are associated with the concepts and premises; and presenting, by the processor, the retrieved images to the user.

A third aspect of the invention provides a hardware device comprising a processor coupled to a computer-readable memory unit, the memory unit comprising instructions that when executed by the processor implements a digital conversion method comprising: receiving, by the processor, text data associated with a text presentation being presented via a hardware device of a user; receiving, by the processor in response to receiving authorization from the user, network based data associated with the user; analyzing, by the processor, semantic attributes of the text data; determining, by the processor based on results of the analyzing the semantic attributes, concepts and premises of the text data; analyzing, by the processor, the network based data; associating, by the processor based on the concepts and premises of the text data and results of the analyzing the network based data, the user with a plurality of users associated with the text presentation resulting in the formation of a group of users; determining, by the processor, a propensity inclination for the group of users with respect to specialized digital dimensions; associating, by the processor based on the propensity inclination for the group of users, retrieved images with the text data, wherein the retrieved images are associated with the concepts and premises; and presenting, by the processor, the retrieved images to the user.

The present invention advantageously provides a simple method and associated system capable of digitally converting text into associated images.

DETAILED DESCRIPTION

Figure 1:
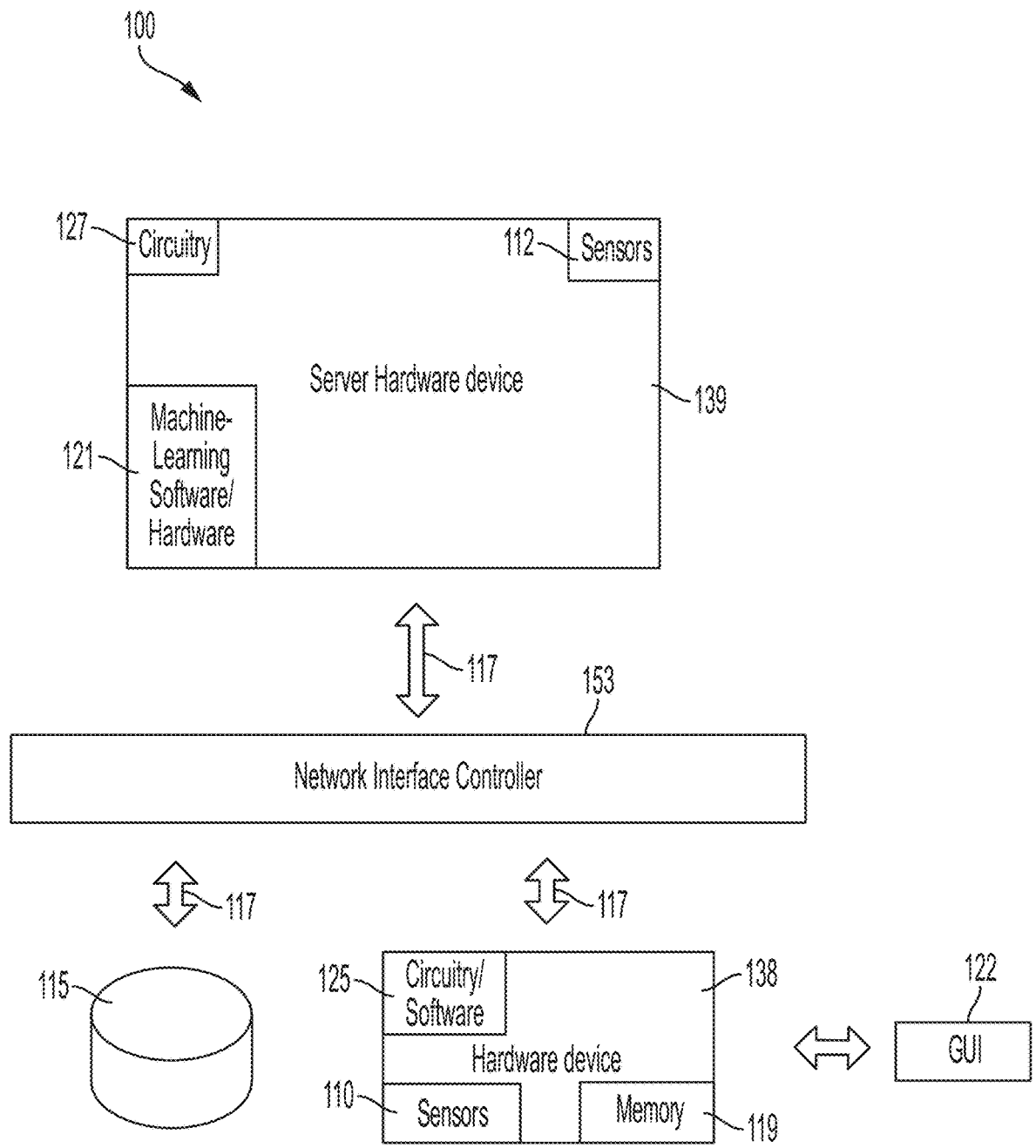
FIG. 1 illustrates a system for improving software conversion technology associated with digitally isolating sematic attributes and concepts of text data associated with a user and associating and presenting images associated with the text data, in accordance with embodiments of the present invention.

FIG. 1 illustrates a system 100 for improving software conversion technology associated with digitally isolating sematic attributes and concepts of text data associated with a user and associating and presenting images associated with the text data, in accordance with embodiments of the present invention. Text presentations enable users to learn and retain information. During a typical text presentation, a user may interpret differing sections of the presentation by associating an image within the user's memory instead of based on reader inclination at a specified point of time. Likewise, during a typical text presentation reading process, a user may typically maintain storage of the content of the text presentation by converting the content into a story of images based on user attributes for developing a user affinity system and a spontaneous cognitive process. Additionally, a user may be unable to form a story of images due to various user physical and social sensory constraints. Therefore, in order to improve user effort with respect to progressing towards cognitive and machine learning capability to relieve the aforementioned constraints, system 100 enables an intelligent software/hardware system for automatically processing and interpreting a text story based on user attributes and an associated value system. The aforementioned process is configured for transforming the text story into story of images with respect to the user attributes and associated value system and storing the result within a digital memory for future consumption. The intelligent software/hardware system enables a process for overcoming various constraints and transforming the text story into story of images aligned to user's schooling and value system for improved consumption thereby enabling a knowledge software building process with respect to a minimal amount of time for instant consumption with respect to further application at a later point in time.

System 100 is enabled to convert a text story into a digital semantic structure as described in the following process. The process is initiated when a user begins to read a story via an electronic reader comprised by a wearable device capable of projecting an image. An electronic book page flip mechanism is integrated with a smart image reader device. Subsequently (during a reading process), system 100 executes code for deriving a central theme of the story. During text processing (of the story), system 100 identifies all derived themes (i.e., central themes and branch themes) based on detected concepts and premises. The processed story is stored in the form of a semantic structure associated with the central theme and the branch themes.

System 100 enables a process for determining a central theme and branch attributes for the text story determination. The process for determining a central theme includes identifying a boundary for deriving the central theme. For example, a statement from the English language may be considered a boundary. The statement may include a declarative statement, an imperative statement, an interrogative statement, an exclamative statement, etc. After the boundary has been identified, system 100 extracts a list comprising an entity and an action and extracts a list of all possible concepts associated with the boundary. With respect to each concept (C[i]) on the list, system 100 derives all leading questions generated from the concept via usage of code W-H. Subsequently, system 100 applies the entity and the action to filter the all W-H questions to generate a possible next best situation (NBS11, NBS12 . . . ) and form a map M1 {(C1, NBS11, NBS12 . . . ), (C2, NBS21, NBS22 . . . ), (C3 . . . )}. The aforementioned process is configured to associate a list of possible premises corresponding to each processed boundary of the story. Likewise, what matters most code (WMM) is applied to a list of concepts M1 (i.e., a reader's demographic) to derive a list of possible premises. A top premise is identified based on applying "WMM" principles. A first boundary is generated by assigning a top premise to a central theme. System 100 is further configured to recursively repeat the aforementioned steps to identify a top premise for a given boundary and each distance for each top premise is measured from a central theme based on a threshold such that a top premise is merged to a central theme or the top premise is added to a branch.

System 100 enables a process for transforming the semantic structure into associated frame structures by recursively identifying a top premise associated with a boundary. Additionally, system 100 executed code to determine if a premise is currently closed such that system 1000 initiates a process for creating a frame for the closed premise.

System 100 is further enabled to construct and transform pictorial frames by extracting images from a repository (for example, a proprietary image repository supported by ML based on an orchestration layer) to be extracted from a closed premise. Associations with other entities may be derived based on a value stream of an electronic reader with respect to background evaluating mood process and tone presentation based on the concept and NBS. Semantic structures are converted into most appropriate frames and stored as a frame structure corresponding to all central theme and branch themes.

The following process for converting a textual story into a pictorial story is described as follows:

The process is initiated when concept evaluation code is executed for sequentially identifying phrases referring to concepts of interests within story text via execution of function algorithm f1(x) code (based on enabling machine learning tagger software/hardware). Additionally, enabling software/hardware is combined with a (f1 $\circ$ c) (x) outcome with respect to matrices of a concept as Mc1[1 . . . n].

A next best situation (NBS) is automatically generated from via natural language programming (NLP) and contextual aggregation via execution of a multinomial logistic regression algorithm f2(x) and matrices of a concept Mc1[1 . . . n] for a given statement/sentence being evaluated. Interleaved selection and transformation phases apply combined semantic-syntactic analysis code to gradually refine natural input text into a high density of text fragments comprising high content value. An identified what/how/which/when [WH] statement from f2(x) is run with respect to reader propensity/demographic information and an individual propensity inclination system such that matrices of NBS as Mc2[1 . . . n] are generated.

A premise is determined by evaluating Mc1[1 . . . n] and Mc2[1 . . . n] with respect to an f3(Mc1, Mc2) algorithm by forming an affinity of NBS formed within classes of the electronic reader (for example defined as an optimist, a problem solver, an analytic, an artistic etc.) resulting in a literal translation of an equivalent term as a premise from 1 . . . n.

A top premise and associated closure is determined by executing a f4(Mc1, Mc2) algorithm extending from f3 for identifying what matters most to a reader with respect to a concept and NBS to identify a top premise. A reader contextual semantic classification algorithm is executed to derive content and attributes (e.g., emphasis attributes) to be attached to premise fragments. An ecosystem of machine learning components, NLP resources, and process improvements may be additionally executed to derive content and attributes. Concepts may be evaluated with respect to past NBS to evaluate a distance of answering capability measure with respect to a threshold distance to determine a premise closure.

Images are extracted from an image repository based on entities extracted from a closed premise. An entity enclosure or association with other entities based on a propensity inclination stream may be generated for enabling background functionality. A mood and tone presentation may be generated based on a determined concept. Likewise, a frame may be selected from function fImage( ) based on a contextually best fit with respect to a closed premise System 100 of FIG. 1 includes a server hardware device 139 (i.e., specialized hardware), a hardware device 138, a database, and a network interface controller 153 interconnected through a network 117. Server hardware device 139 includes specialized circuitry 127 (that may include specialized software), sensors 112, and machine learning software code/hardware structure 121 (i.e., including machine learning software code). Interface controller 153 may include any type of device or apparatus for securely interfacing hardware and software to a network. Hardware device 138 comprises any type of hardware or software device associated with presentation of text and images and may include, inter alia, a wearable device (e.g., smart glasses), an electronic book reader, a tablet computer, a computer, etc. Hardware device 138 includes specialized circuitry 125 (that may include specialized software), a graphical user interface (GUI) 122, and sensors 110. Sensors 110 and 112 may include any type of internal or external sensor including, inter alia, ultrasonic three-dimensional sensor modules, a temperature sensor, an ultrasonic sensor, an optical sensor, a video retrieval device, an audio retrieval device, humidity sensors, voltage sensors, pressure sensors, etc. Server hardware device 139 and hardware device 138 each may comprise an embedded device. An embedded device is defined herein as a dedicated device or computer comprising a combination of computer hardware and software (fixed in capability or programmable) specifically designed for executing a specialized function. Programmable embedded computers or devices may comprise specialized programming interfaces. In one embodiment, server hardware device 139 and hardware device 138 may each comprise a specialized hardware device comprising specialized (non-generic) hardware and circuitry (i.e., specialized discrete non-generic analog, digital, and logic-based circuitry) for (independently or in combination) executing a process described with respect to FIGS. 1-8. The specialized discrete non-generic analog, digital, and logic-based circuitry may include proprietary specially designed components (e.g., a specialized integrated circuit, such as for example an Application Specific Integrated Circuit (ASIC) designed for only implementing an automated process for improving software conversion technology associated with digitally isolating sematic attributes and concepts of text data associated with a user and associating and presenting images associated with the text data. Network 117 may include any type of network including, inter alia, a 5G telecom network, a local area network, (LAN), a wide area network (WAN), the Internet, a wireless network, etc. Alternatively, network 117 may include an application programming interface (API).

System 100 is enabled to process stories (for example, from text from an input device) and generate a visualization of a story (for example using a display device such as GUI 122) using a plurality of image frames representing associated concepts (derived via circuitry software 125) such as profiling, conceptual premise, and artificial intelligence extraction aligned with a central theme and associated branches.

System 100 enables a process to derive a user's propensity dimensions from a propensity specific user profile (from a storage of profiles generated via hardware and software), and an affinity specific group profile by introducing four dimensions. The four dimensions include next best situation (NBS) dimensions, what matters most (WMM) dimensions, influencing events dimensions, and preferential alignment filter (de-contextual preference) dimensions.

System 100 is configured to apply artificial intelligence code for reassembling a propensity inclination of individual users to anonymize a plurality of federated users belonging to an affinity group while maintaining and learning (for example, via embedded data and code) insight attributions of the affinity groups received from available social media and public data via network 117.

System 100 is enabled to further process a text story (for example, from text from an input device) via execution of NBS dimensions of a user profile. The story is divided into a plurality of conceptual branches each associated with a bounded premise built upon a plurality of concepts and an NBS. A plurality of central branch or central theme and branches bounded by a premise are processed via NBS dimensions to determine a closure of the premise.

System 100 enables a process for categorizing a plurality of premises via execution of what matters most code and WMM dimensions retrieved from a propensity inclination of the user. The categorization results in determination of a central premise or a branch premise.

System 100 executes influencing event dimensions from a user's propensity inclination. A user's propensity specific profile is maintained as an affinity specific group profile for transforming each closed branch belonging to the text based semantic model of the story with respect to a picture frame aligned to an associated contextual premise.

System 100 use a propensity inclination maintained as an affinity specific group profile in composition with a plurality of events, premises, and concepts while applying an artificial intelligence technique to construct an image story from a text story.

Figure 2:
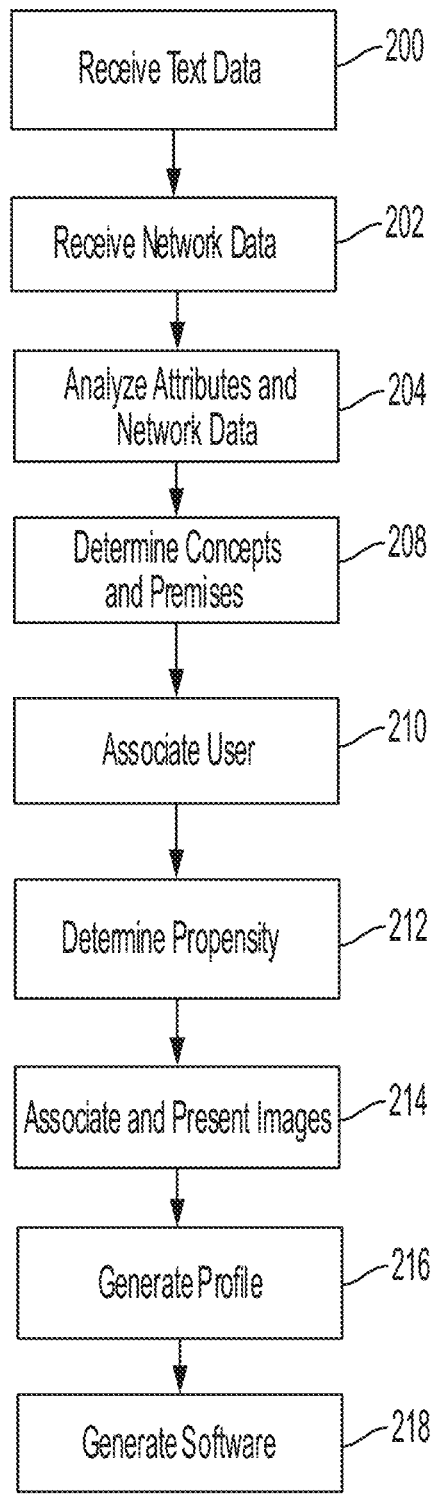
FIG. 2 illustrates an algorithm detailing a process flow enabled by the system of FIG. 1 for improving software conversion technology associated with digitally isolating sematic attributes and concepts of text data associated with a user and associating and presenting images associated with the text data, in accordance with embodiments of the present invention.

FIG. 2 illustrates an algorithm detailing a process flow enabled by system 100 of FIG. 1 for improving software conversion technology associated with digitally isolating sematic attributes and concepts of text data associated with a user and associating and presenting images associated with the text data, in accordance with embodiments of the present invention. Each of the steps in the algorithm of FIG. 2 may be enabled and executed in any order by a computer processor(s) executing computer code. Additionally, each of the steps in the algorithm of FIG. 2 may be enabled and executed in combination by server hardware device 139 and hardware device 138. In step 200, text data associated with a text presentation being presented via a hardware device of a user is received. In step 202, network-based data associated with the user is received in response to receiving authorization from the user. The network-based data may include: social media data, event-based data, group-based data associated with the user, etc.

In step 204, semantic attributes of the text data is analyzed. Additionally, the network-based data is analyzed. Analyzing the network-based data may include identifying events associated with the user and associated users; and analyzing the events to determine said specialized digital dimensions.

In step 208, concepts and premises of the text data are determined based on results the analysis of step 204. In step 210, the user is associated with a plurality of users associated with the text presentation resulting in the formation of a group of users. The association is executed based on the concepts and premises and results of the analysis of step 204. In step 212, a propensity inclination for the group of users is determined with respect to the specialized digital dimensions. The specialized digital dimensions may include, inter alia, next best situation dimensions, what matters most dimensions, influencing event dimensions, de-contextual preference dimensions, etc.

In step 214, retrieved images are associated with the text data based on the propensity inclination for the group of users. The retrieved images are associated with the concepts and premises. The retrieved images are presented to the user. Associating the retrieved images with the text data may include:
1. Dividing the text presentation into a plurality of conceptual branches.
2. Associating each branch of the conceptual branches with a bounded premise of the concepts and premises.
3. Determining closure attributes of the bounded premise via execution of the next best situation dimensions.
4. Categorizing the concepts and premises via execution of the what matters most dimensions with respect to the propensity inclination and the bounded premise.
5. Executing the influencing event dimensions with respect to a propensity inclination profile for the user associated with the text data.
6. Transforming each closed branch associated with a text based semantic model associated with the text data into an image frame of the retrieved images with respect to an associated contextual premise of the concepts and premises.
7. Executing the propensity inclination profile with respect to a composition of a plurality of events associated with the concepts and premises.
8. Applying artificial intelligence code to execute associating the retrieved images with the text data.

In step 216, a propensity inclination profile for the user and additional propensity inclination profiles for the plurality of users are generated with respect to the text data. Additionally, the specialized digital dimensions are determined (with respect to the propensity inclination) based on the propensity inclination profile and the additional propensity inclination profiles. In step 218, semantic model software associated with the images is generated. Additionally, self-learning software code configured to execute future instances of associating the retrieved images is generated.

Figure 3:
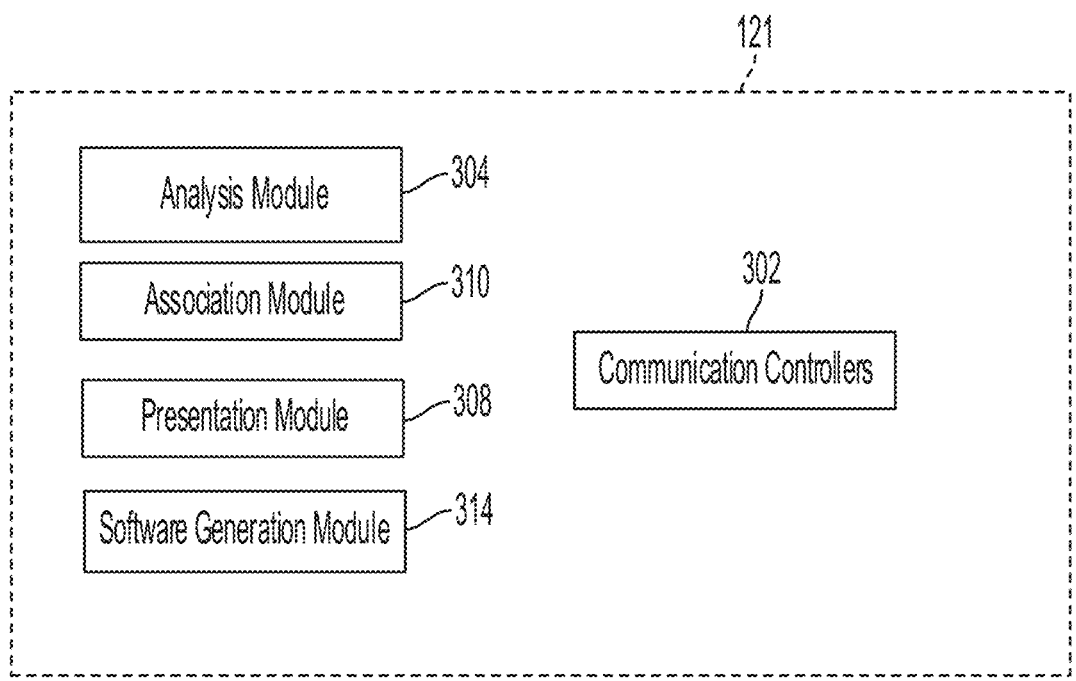
FIG. 3 illustrates an internal structural view of the machine learning software/hardware structure and/or the circuitry/software of FIG. 1, in accordance with embodiments of the present invention.

FIG. 3 illustrates an internal structural view of software/hardware structure 121 (and/or circuitry 127) of FIG. 1, in accordance with embodiments of the present invention. Machine learning software/hardware structure 121 includes an analysis module 304, an association module 310, a presentation module 308, a software generation module 314, and communication controllers 302. Analysis module 304 comprises specialized hardware and software for controlling all functions related to the analysis steps of FIGS. 1 and 2. Association module 310 comprises specialized hardware and software for controlling all functionality related to the association steps for implementing the process described with respect to the algorithm of FIG. 2. Presentation module 308 comprises specialized hardware and software for controlling all functions related to the presentation steps of FIG. 2. Software generation 314 comprises specialized hardware and software for controlling all functions related to generating software as described with respect to the algorithm of FIG. 2. Communication controllers 302 are enabled for controlling all communications between analysis module 304, association module 310, presentation module 308, and software generation module 314.

Figure 4:
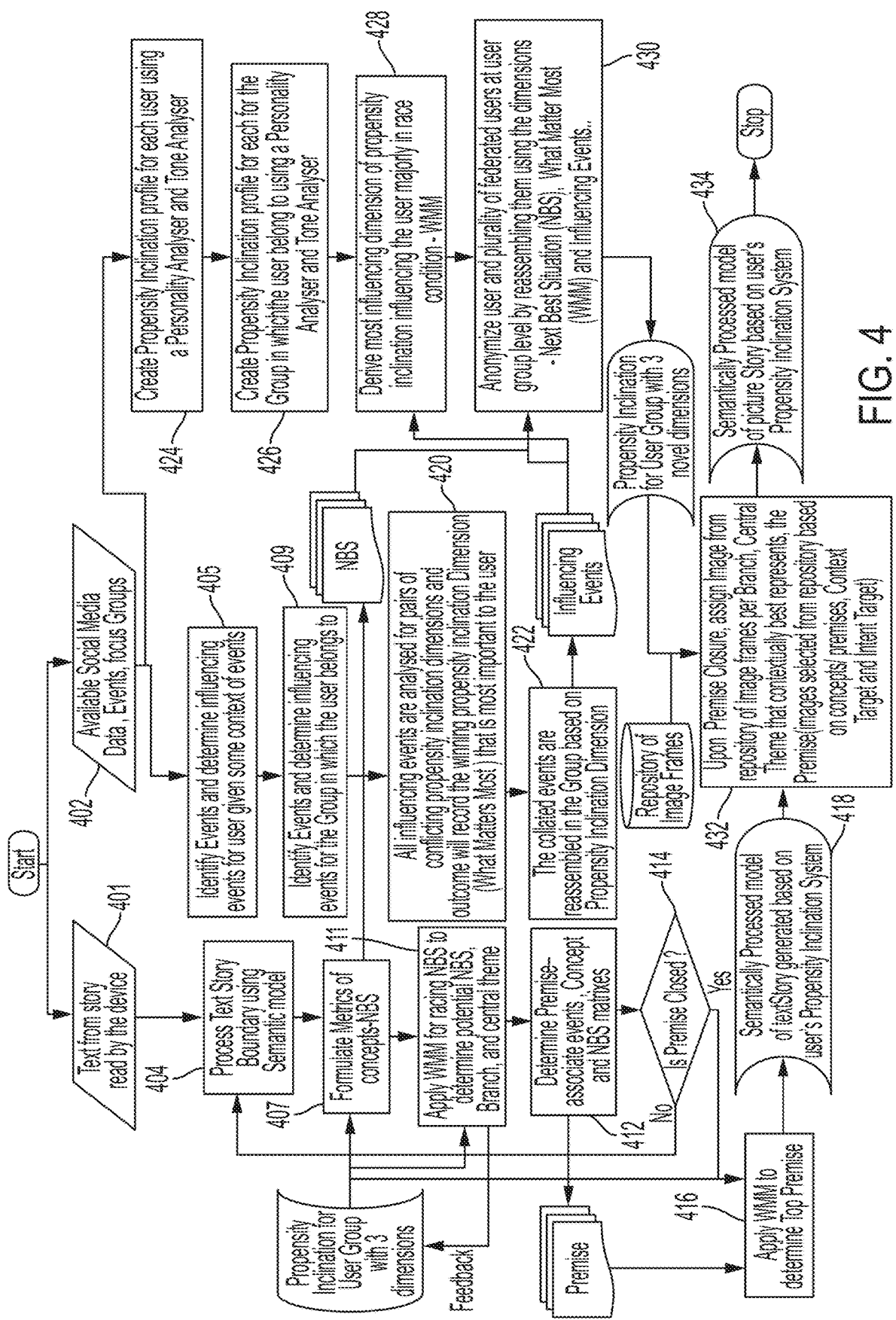
FIG. 4 illustrates an algorithm detailing an implementation process flow enabled by the system of FIG. 1 for digitally converting text data of a story with images associated with the text data, in accordance with embodiments of the present invention.

FIG. 4 illustrates an algorithm detailing an implementation process flow enabled by system 100 of FIG. 1 for digitally converting text data of a story with images associated with the text data, in accordance with embodiments of the present invention. In step 401, text data (of a story or literature) is retrieved. In step 402, social media data associated with the user is retrieved. In step 404, a boundary of the text data is processed via execution of a semantic model and associated code. In step 405, events (retrieved from step 402) for the user are identified and influencing events associated with the user are determined with respect to the identified events. In step 407, metrics of concepts (of the text data) are formulated by processing the text data by digitally reading each sentence at a unit level and associating each sentence with associated concepts and an associated next best situation (NBS) determined based on user profile associated with information of the user. The aforementioned process of step 407 is executed via a process for reading, learning, and analyzing movies and communications enabled via social media sources. The identified events are associated with the concepts by correlating the events based on a propensity inclination of the user or affinity group associated with the user.

In step 409, events for a group of users associated with the user are identified and influencing events are determined with respect to the identified events. The influencing events are associated with a dimension associated with the user's propensity inclination retrieved from the user propensity specific profile and an affinity specific group profile. Further influencing events are derived by correlating an association of events with contextual events and upon executing further correlation and regression with the user's propensity inclination dimensions. In step 411, WMM code is applied to the NBS to determine an NBS based branch and central theme. In step 412, a premise and associated events are determined and in step 414, it is determined if the premise has been closed (disabled). If in step 414, it is determined that the premise has not been closed then step 404 is repeated. If in step 414, it is determined that the premise has t been closed then in step 416, the WMM code is executed to determine a top premise. In step 418, a semantically processed model associated with the text data is generated. In step 420, all influencing events (from steps 405 and 409) are analyzed to determine pairs of conflicting propensity inclinations. In step 422, collated events are reassembled based on the propensity inclination dimensions. In step 424, a propensity inclination profile is generated for the user. In step 426, a propensity inclination profile is generated for the group of users. In step 428, a most influencing dimension is derived and in step 430, all users are anonymized with respect to execution of the dimensions. In step 432, the aforementioned processed text data is associated with images for presentation in step 434. The aforementioned algorithm is configured to enable intelligent processing of text data and represent a visualization of the text data via a display device using a plurality of image frames representing appropriate concepts aligned to central themes and branches. The central themes and branches are generated via execution of intelligent text processing code.

Figure 5A:
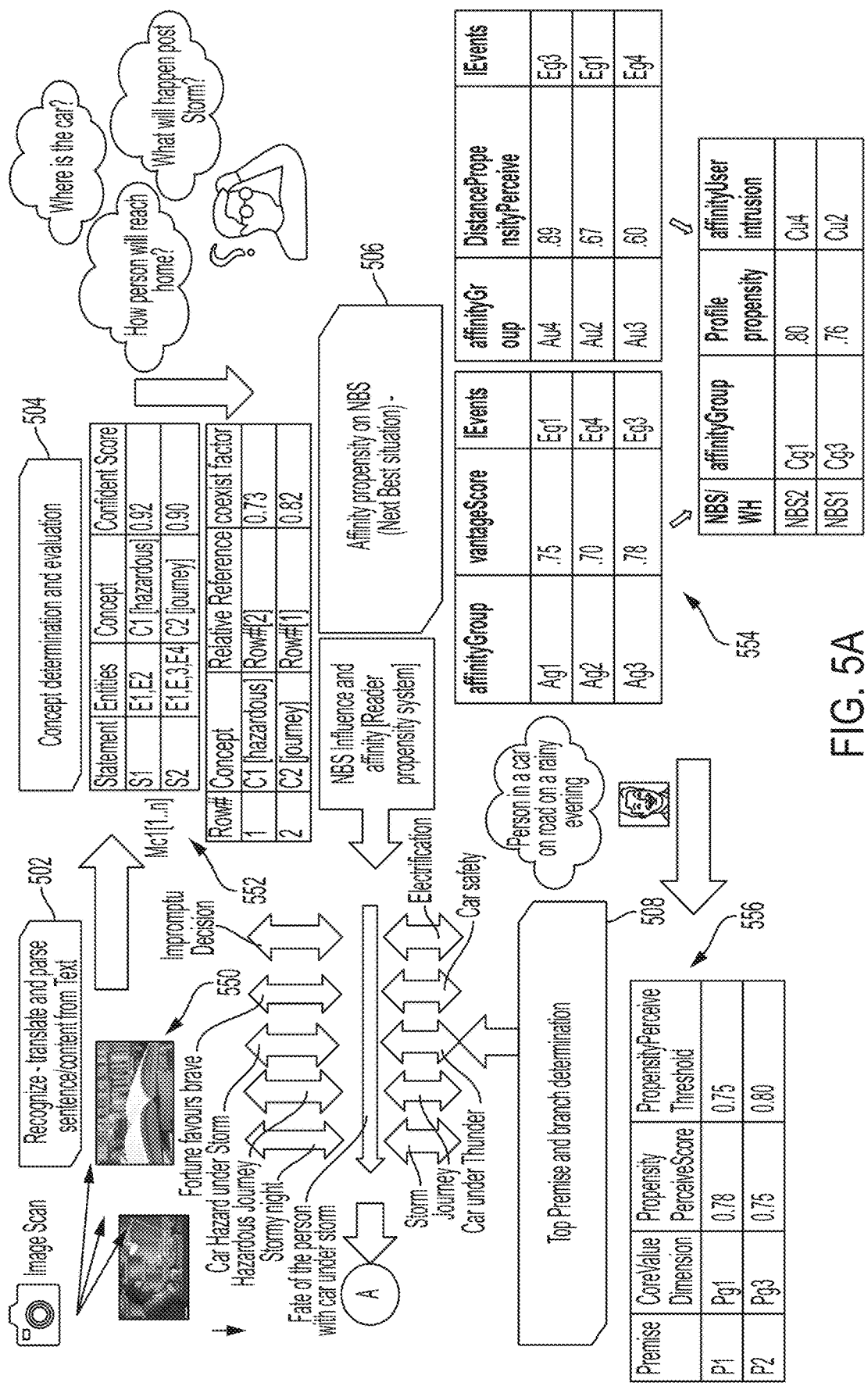
FIGS. 5A and 5B illustrate a process for generating images associated with a text story, in accordance with embodiments of the present invention.
Figure 5B:
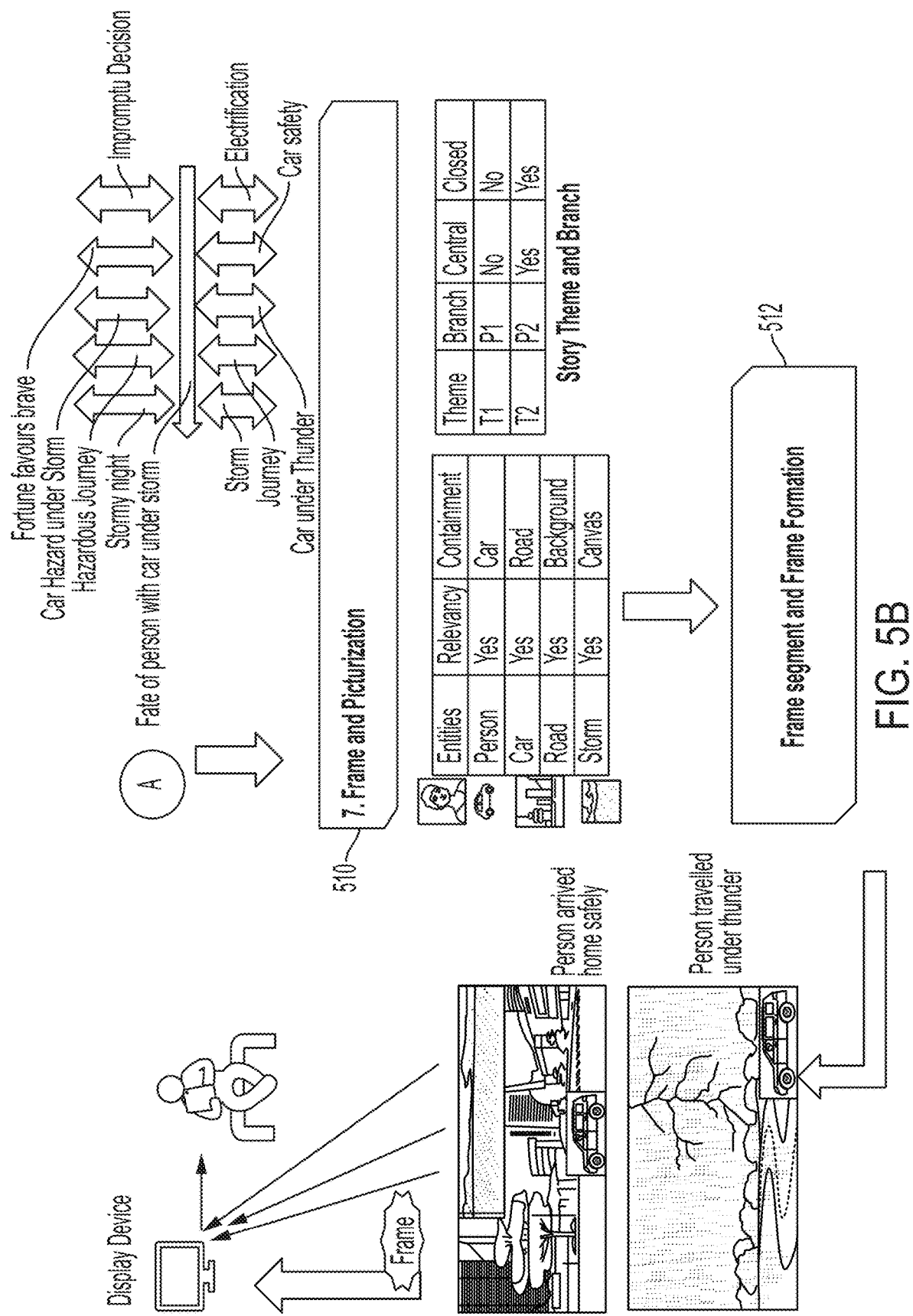

FIGS. 5A and 5B illustrate a process for generating images associated with a text story, in accordance with embodiments of the present invention. In step 502, images 550 are scanned, translated, and parsed. In step 504, a concept determination and evaluation algorithm is executed for considering (representative example) information 552 comprising extracted unstructured data and associated entitles, contextual detail, reader specific demographic detail, and sentiment passed through a ML regression model. In step 506, an affinity propensity is determined with respect to an NB S with respect to affinity groups (representative example) information 554. The affinity propensity is determined based on a dimension of propensity metrices in relation with a reader affinity group self-ascendancy (outside an affinity group) processed via an ML technique for deriving a propensity to economic affinity segment based on an event vector, an influencing event to which reader is inclined to, and to what extent or percentile of the inclination is directed. Likewise, a reader propensity system is processed with respect to the aforementioned outcome and events aggregation and regression ML model. The reader propensity system is processed by employing a semantic analysis to gradually refine an NBS into a high density of text fragments comprising a high affinity value associated with respective affinity dimensions. In step 508, a top premise and branch (representative example) 556 is determined by identifying what matter most (WMM) dimensions from a reader's propensity Likewise, WH Question/NBS run through a regression model are processed to derive a top premise. A reader contextual semantic classification algorithm is executed to derive content and attributes of premise fragments.

In step 510 (in FIG. 5B), images are extracted from an image repository and associated with other entities based on a propensity stream of the reader and its influencing events and what matters most dimension with respect to standard dimensions running into a condition, mood, and tone presentation based on a concept. In step 512, image frames are formed and segmented.

Figure 6:
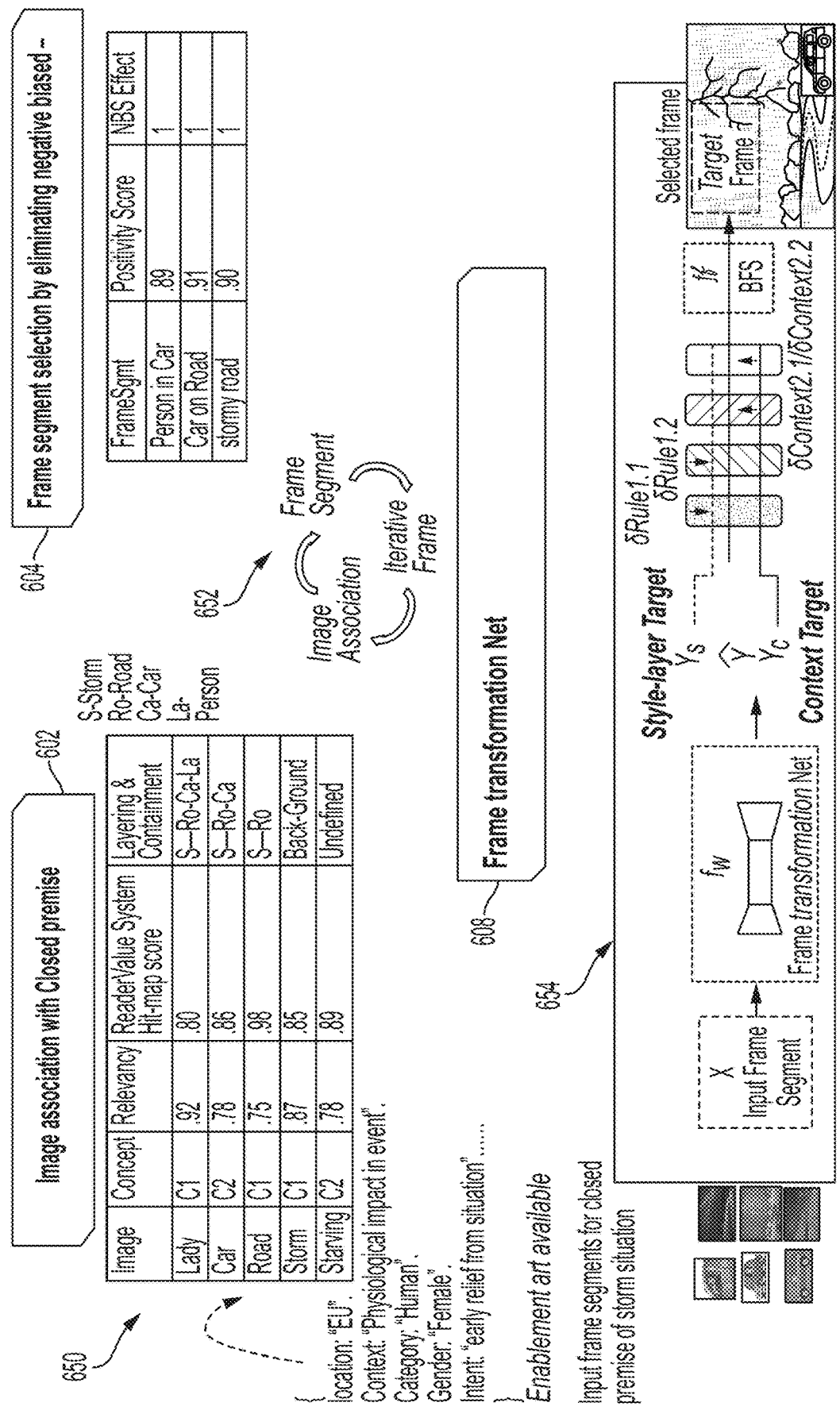
FIG. 6 illustrates a detailed description of a step of FIG. 5B, in accordance with embodiments of the present invention.

FIG. 6 illustrates a detailed description of step 512 of FIG. 5B, in accordance with embodiments of the present invention. In step 602, images are associated with a closed premise 650. Closed premise metrices (of closed premise 650) comprise concepts, NBS, and answers to NBS for evaluation with respect to an algorithm to calculate perceptual differences between images from the image repository with respect to a ground truth of concepts for assigning reader intent and associated layering. In step 604, frame segments 652 are selected by eliminating negative contextual preference situational events thereby effecting reader decisions and sentiment. In step 608, image frames are transformed via an input frame segment process system 654 with respect to a closed premise and matrices.

Figure 7:
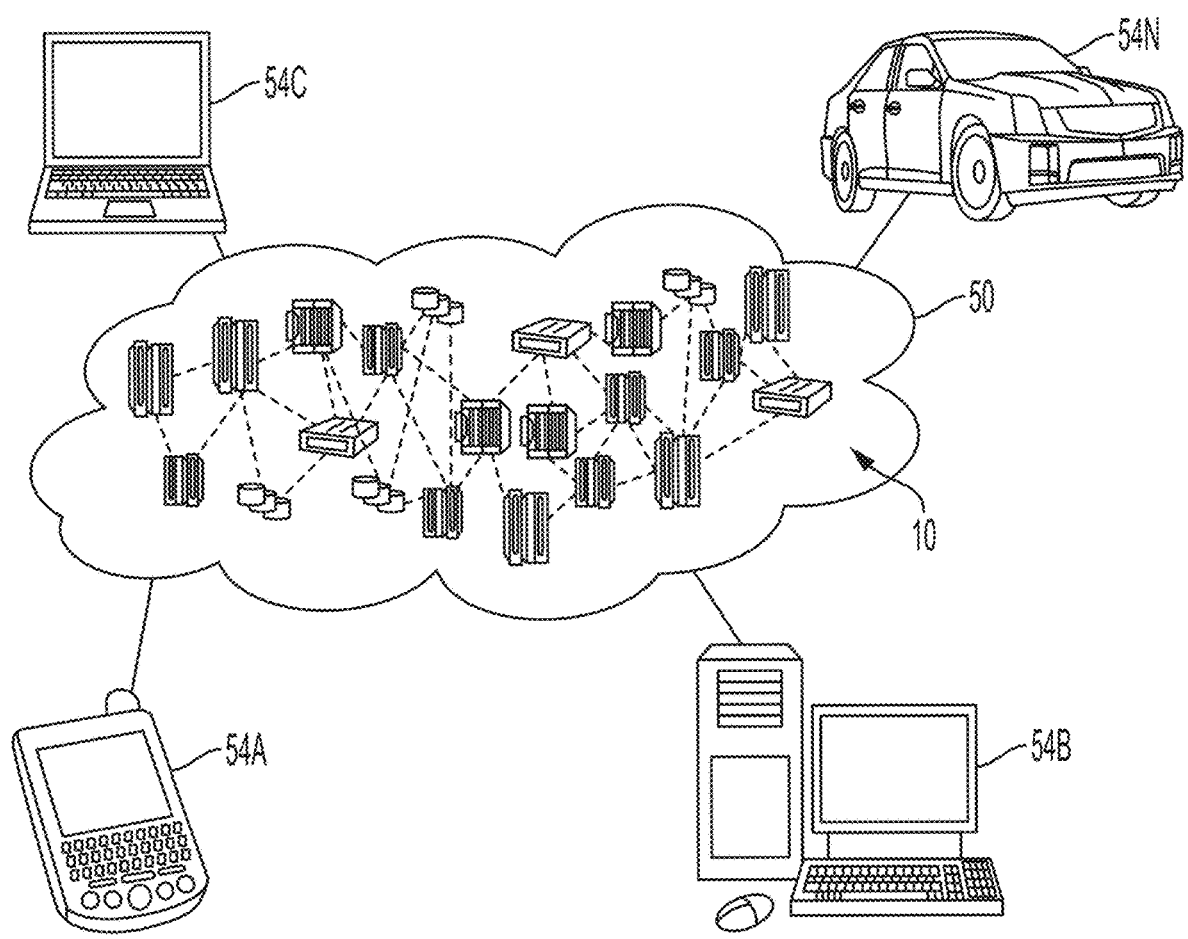
FIG. 7 illustrates a computer system used by the system of FIG. 1 for improving software conversion technology associated with digitally isolating sematic attributes and concepts of text data associated with a user and associating and presenting images associated with the text data, in accordance with embodiments of the present invention.

FIG. 7 illustrates a computer system 90 (e.g., server hardware device 138 and/or hardware device 139 of FIG. 1) used by or comprised by the system of FIG. 1 for improving software conversion technology associated with digitally isolating sematic attributes and concepts of text data associated with a user and associating and presenting images associated with the text data, in accordance with embodiments of the present invention.

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing apparatus receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, device (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, a mobile device, a smart watch, or other programmable data processing device to produce a machine, such that the instructions, which execute via the processor of the computer or other programmable data processing device, create means for implementing the functions/acts specified in the flowchart and/or block diagram block or blocks. These computer readable program instructions may also be stored in a computer readable storage medium that can direct a computer, a programmable data processing device, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing device, or other device to cause a series of operational steps to be performed on the computer, other programmable device or other device to produce a computer implemented process, such that the instructions which execute on the computer, other programmable device, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer system 90 illustrated in FIG. 7 includes a processor 91, an input device 92 coupled to the processor 91, an output device 93 coupled to the processor 91, and memory devices 94 and 95 each coupled to the processor 91. The input device 92 may be, inter alia, a keyboard, a mouse, a camera, a touchscreen, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random-access memory (DRAM), a read-only memory (ROM), etc. The memory device 95 includes a computer code 97. The computer code 97 includes algorithms (e.g., the algorithms of FIGS. 2, 5A, 5B, and 6) for improving software conversion technology associated with digitally isolating sematic attributes and concepts of text data associated with a user and associating and presenting images associated with the text data. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices such as Read-Only Memory (ROM) device or firmware 85) may include algorithms (e.g., the algorithms of FIGS. 2, 5A, 5B, and 6) and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

In some embodiments, rather than being stored and accessed from a hard drive, optical disc or other writeable, rewriteable, or removable hardware memory device 95, stored computer program code 84 (e.g., including algorithms) may be stored on a static, nonremovable, read-only storage medium such as ROM device or firmware 85, or may be accessed by processor 91 directly from such a static, nonremovable, read-only medium. Similarly, in some embodiments, stored computer program code 97 may be stored as ROM device or firmware 85, or may be accessed by processor 91 directly from such ROM device or firmware 85, rather than from a more dynamic or removable hardware data-storage device 95, such as a hard drive or optical disc.

Still yet, any of the components of the present invention could be created, integrated, hosted, maintained, deployed, managed, serviced, etc. by a service supplier who offers to improve software conversion technology associated with digitally isolating sematic attributes and concepts of text data associated with a user and associating and presenting images associated with the text data. Thus, the present invention discloses a process for deploying, creating, integrating, hosting, maintaining, and/or integrating computing infrastructure, including integrating computer-readable code into the computer system 90, wherein the code in combination with the computer system 90 is capable of performing a method for enabling a process for improving software conversion technology associated with digitally isolating sematic attributes and concepts of text data associated with a user and associating and presenting images associated with the text data. In another embodiment, the invention provides a business method that performs the process steps of the invention on a subscription, advertising, and/or fee basis. That is, a service supplier, such as a Solution Integrator, could offer to enable a process for improving software conversion technology associated with digitally isolating sematic attributes and concepts of text data associated with a user and associating and presenting images associated with the text data. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 7 shows the computer system 90 as a configuration of hardware and software, any configuration of hardware and software, as would be known to a person of ordinary skill in the art, may be utilized for the purposes stated supra in conjunction with the computer system 90 of FIG. 7. For example, the memory devices 94 and 95 may be portions of a single memory device rather than separate memory devices.

Cloud Computing Environment

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
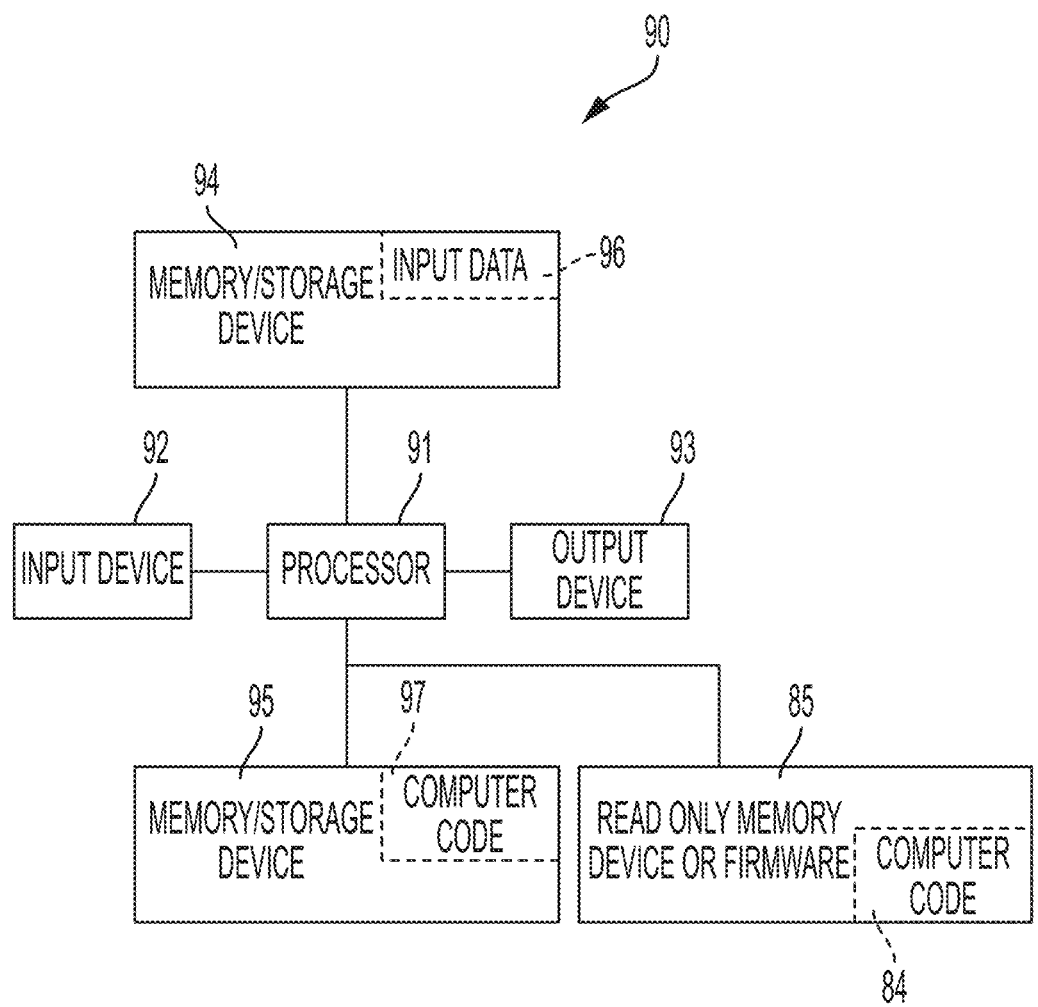
FIG. 8 illustrates a cloud computing environment, in accordance with embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 9:
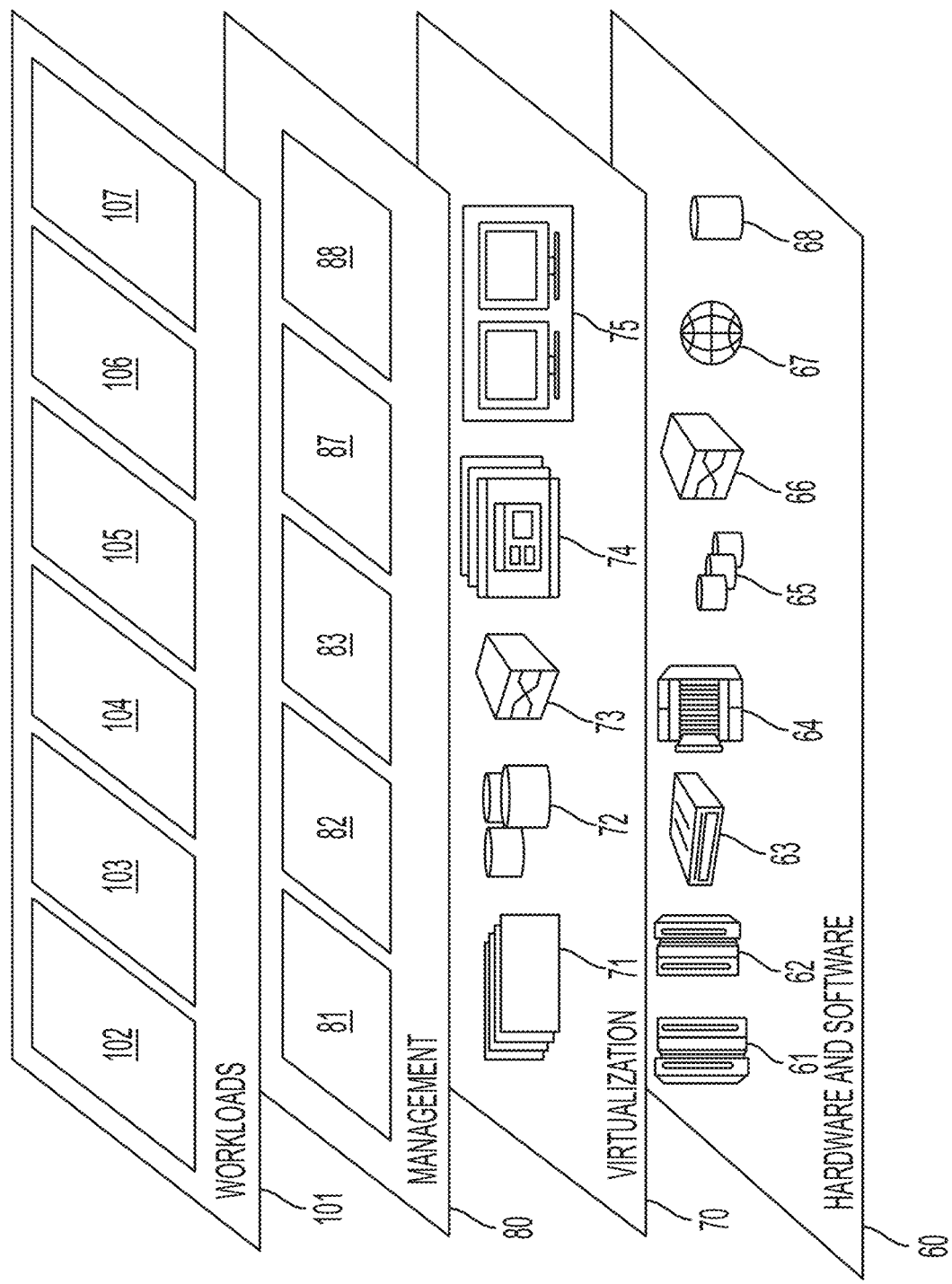
FIG. 9 illustrates a set of functional abstraction layers provided by cloud computing environment, in accordance with embodiments of the present invention.

Referring now to FIG. 9, a set of functional abstraction layers provided by cloud computing environment 50 (see FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 87 provides cloud computing resource allocation and management such that required service levels are met. Service Level Agreement (SLA) planning and fulfillment 88 provide pre-arrangement for, and procurement of, cloud computing resources for which a future requirement is anticipated in accordance with an SLA.

Workloads layer 101 provides examples of functionality for which the cloud computing environment may be utilized. Examples of workloads and functions which may be provided from this layer include: mapping and navigation 102; software development and lifecycle management 103; virtual classroom education delivery 133; data analytics processing 134; transaction processing 106; and for improving software conversion technology associated with digitally isolating sematic attributes and concepts of text data associated with a user and associating and presenting images associated with the text data 107.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A digital conversion method comprising:
    receiving, by a processor of a server hardware device, text data associated with a text presentation being presented via a hardware device of a user;
    receiving, by said processor in response to receiving authorization from said user, network-based data associated with said user;
    analyzing, by said processor, semantic attributes of said text data;
    determining, by said processor based on results of said analyzing said semantic attributes, concepts and premises of said text data;
    analyzing, by said processor, said network-based data;
    associating, by said processor based on said concepts and premises of said text data and results of said analyzing said network-based data, said user with a plurality of users associated with said text presentation resulting in the formation of a group of users;
    determining, by said processor, a propensity inclination for said group of users with respect to specialized digital dimensions;
    associating, by said processor based on said propensity inclination for said group of users, retrieved images with said text data, wherein said retrieved images are associated with said concepts and premises;
    presenting, by said processor, said retrieved images to said user;
    generating, by said processor, self-learning software code configured to execute future instances of said associating said retrieved images with the text data associated with the text presentation being presented via the hardware device of a user, said text data being a text story;
    applying artificial intelligence code for reassembling a propensity inclination profile of individual users to anonymize a plurality of federated users belonging to an affinity group of a plurality of affinity groups while maintaining and learning, via embedded data and code, insight attributions of the plurality of affinity groups received from available social media and public data via a network, wherein the propensity inclination profile is associated with said text data, and wherein the propensity inclination profile is with respect to a composition of a plurality of events associated with said concepts and premises; and
    maintaining and learning, via embedded data, insight attributions of said group of users.

2. The method of claim 1, wherein said specialized digital dimensions comprise next best situation dimensions, what matters most dimensions, influencing event dimensions, and de-contextual preference dimensions.

3. The method of claim 1, wherein said specialized digital dimensions comprise next best situation dimensions, and wherein said associating said retrieved images with said text data comprises:
    dividing said text presentation into a plurality of conceptual branches;
    associating each branch of said conceptual branches with a bounded premise of said concepts and premises; and
    determining closure attributes of said bounded premise via execution of said next best situation dimensions.

4. The method of claim 1, wherein said specialized digital dimensions comprise what matters most dimensions, said method further comprising:
    categorizing said concepts and premises via execution of said what matters most dimensions with respect to said propensity inclination and a bounded premise of said concepts and premises.

5. The method of claim 1, wherein said specialized digital dimensions comprise influencing event dimensions, said method further comprising:
    executing said influencing event dimensions with respect to a propensity inclination profile for said user, wherein the propensity inclination profile is associated with said text data;
    transforming each closed branch associated with a text based semantic model associated with said text data into an image frame of said retrieved images with respect to an associated contextual premise of said concepts and premises.

6. The method of claim 1, said method further comprising:
    executing a propensity inclination profile with respect to a composition of a plurality of events associated with said concepts and premises, wherein the propensity inclination profile is associated with said text data; and applying artificial intelligence code to execute said associating said retrieved images with said text data.

7. The method of claim 1, wherein said analyzing said network-based data comprises:
   identifying events associated with said user and associated users; and
   analyzing said events to determine said specialized digital dimensions.

8. The method of claim 1, wherein said network-based data comprises: social media data, event-based data, and group-based data associated with said user.

9. The method of claim 1, said method further comprising:
   generating, by said processor, propensity inclination profiles for said plurality of users with respect to said text data; and
   determining, by said processor based on said propensity inclination profiles, said specialized digital dimensions with respect to said propensity inclination.

10. The method of claim 1, said method further comprising:
    generating, by said processor, semantic model software associated with said images.

11. The method of claim 1, said method further comprising:
    transforming, by the processor, the text story into a story of images aligned to the user's schooling and value system for improved consumption thereby enabling a knowledge software building process with respect to a minimal amount of time for instant consumption with respect to further application at a later point in time.

12. The method of claim 1, said method further comprising
    converting, by the processor in response to user beginning to read the text story via an electronic reader comprised by a wearable device capable of projecting an image, the text story into a digital semantic structure, said converting the text story comprising:
       identifying, by the processor during a text processing of the text story and based on the concepts and premises, a central theme and all branch themes of the text story; and
       storing, by the processor, the text processed text story in a form of the digital semantic structure associated with the central theme and all branch themes.

13. The method of claim 12, said method further comprising:
    integrating, by the processor, an electronic book page flip mechanism with a smart image reader device.

14. A computer program product, comprising a computer readable hardware storage device storing a computer readable program code, said computer readable program code comprising an algorithm that when executed by a processor of a server hardware device implements a digital conversion method, said method comprising:
    receiving, by said processor, text data associated with a text presentation being presented via a hardware device of a user;
    receiving, by said processor in response to receiving authorization from said user, network-based data associated with said user;
    analyzing, by said processor, semantic attributes of said text data;
    determining, by said processor based on results of said analyzing said semantic attributes, concepts and premises of said text data;
    analyzing, by said processor, said network-based data;
    associating, by said processor based on said concepts and premises of said text data and results of said analyzing said network-based data, said user with a plurality of users associated with said text presentation resulting in the formation of a group of users;
    determining, by said processor, a propensity inclination for said group of users with respect to specialized digital dimensions;
    associating, by said processor based on said propensity inclination for said group of users, retrieved images with said text data, wherein said retrieved images are associated with said concepts and premises;
    presenting, by said processor, said retrieved images to said user;
    generating, by said processor, self-learning software code configured to execute future instances of said associating said retrieved images with the text data associated with the text presentation being presented via the hardware device of a user, said text data being a text story;
    applying artificial intelligence code for reassembling a propensity inclination profile of individual users to anonymize a plurality of federated users belonging to an affinity group of a plurality of affinity groups while maintaining and learning, via embedded data and code, insight attributions of the plurality of affinity groups received from available social media and public data via a network, wherein the propensity inclination profile is associated with said text data, and wherein the propensity inclination profile is with respect to a composition of a plurality of events associated with said concepts and premises; and
    maintaining and learning, via embedded data, insight attributions of said group of users.

15. The computer program product of claim 14, wherein said specialized digital dimensions comprise next best situation dimensions, what matters most dimensions, influencing event dimensions, and de-contextual preference dimensions.

16. The computer program product of claim 14, wherein said specialized digital dimensions comprise next best situation dimensions, and wherein said associating said retrieved images with said text data comprises:
    dividing said text presentation into a plurality of conceptual branches;
    associating each branch of said conceptual branches with a bounded premise of said concepts and premises; and
    determining closure attributes of said bounded premise via execution of said next best situation dimensions.

17. The computer program product of claim 14, wherein said specialized digital dimensions comprise what matters most dimensions, and wherein said method further comprises:
    categorizing said concepts and premises via execution of said what matters most dimensions with respect to said propensity inclination and a bounded premise of said concepts and premises.

18. The computer program product of claim 14, wherein said specialized digital dimensions comprise influencing event dimensions, and wherein said method further comprises:
    executing said influencing event dimensions with respect to a propensity inclination profile for said user, wherein the propensity inclination profile is associated with said text data;

transforming each closed branch associated with a text based semantic model associated with said text data into an image frame of said retrieved images with respect to an associated contextual premise of said concepts and premises.

19. The computer program product of claim 14, wherein said method further comprises:
   executing a propensity inclination profile with respect to a composition of a plurality of events associated with said concepts and premises, wherein the propensity inclination profile is associated with said text data; and
   applying artificial intelligence code to execute said associating said retrieved images with said text data.

20. A hardware device comprising a processor coupled to a computer-readable memory unit, said memory unit comprising instructions that when executed by the processor implements a digital conversion method comprising:
   receiving, by said processor, text data associated with a text presentation being presented via a hardware device of a user;
   receiving, by said processor in response to receiving authorization from said user, network-based data associated with said user;
   analyzing, by said processor, semantic attributes of said text data;
   determining, by said processor based on results of said analyzing said semantic attributes, concepts and premises of said text data;
   analyzing, by said processor, said network-based data;
   associating, by said processor based on said concepts and premises of said text data and results of said analyzing said network-based data, said user with a plurality of users associated with said text presentation resulting in the formation of a group of users;
   determining, by said processor, a propensity inclination for said group of users with respect to specialized digital dimensions;
   associating, by said processor based on said propensity inclination for said group of users, retrieved images with said text data, wherein said retrieved images are associated with said concepts and premises;
   presenting, by said processor, said retrieved images to said user;
   generating, by said processor, self-learning software code configured to execute future instances of said associating said retrieved images with the text data associated with the text presentation being presented via the hardware device of a user, said text data being a text story;
   applying artificial intelligence code for reassembling a propensity inclination profile of individual users to anonymize a plurality of federated users belonging to an affinity group of a plurality of affinity groups while maintaining and learning, via embedded data and code, insight attributions of the plurality of affinity groups received from available social media and public data via a network, wherein the propensity inclination profile is associated with said text data, and wherein the propensity inclination profile is with respect to a composition of a plurality of events associated with said concepts and premises; and
   maintaining and learning, via embedded data, insight attributions of said group of users.

\* \* \* \* \*